United States Patent [19]

Welsh

[11] Patent Number: 5,059,319

[45] Date of Patent: Oct. 22, 1991

[54] PAINT CAN STRAINER COVER

[76] Inventor: Matthew J. Welsh, 33 Mt. Vernon Rd., Columbia, N.J. 07832

[21] Appl. No.: 633,059

[22] Filed: Dec. 24, 1990

[51] Int. Cl.$^5$ ............................................ B01D 25/00
[52] U.S. Cl. ................................ 210/232; 210/238; 210/250; 210/250; 210/464; 210/469; 210/495; 248/94; 220/354
[58] Field of Search .............. 210/464, 469, 473, 474, 210/475, 499, 483, 348, 495, 232, 238, 477, 482, 497.03; 160/395, 391, 392; 248/94; 220/354

[56] References Cited

U.S. PATENT DOCUMENTS

| | | | |
|---|---|---|---|
| 965,611 | 7/1910 | Tucker | 210/474 |
| 1,051,735 | 1/1913 | Hammond | 210/474 |
| 1,087,708 | 2/1914 | Bendix | 210/495 |
| 2,070,998 | 2/1937 | Odom | 210/495 |
| 2,897,889 | 8/1959 | Kessler | 160/392 |
| 3,301,404 | 1/1967 | Becker | 210/469 |
| 4,279,358 | 7/1981 | Jacobs | 220/354 |
| 4,497,709 | 2/1985 | Nicholson | 210/495 |
| 4,804,470 | 2/1989 | Calvillo et al. | 210/469 |
| 4,966,697 | 10/1990 | Rosaen | 210/232 |

Primary Examiner—Robert A. Dawson
Assistant Examiner—Ana M. Fortuna
Attorney, Agent, or Firm—Kenneth P. Glynn

[57] ABSTRACT

The present invention is directed toward a device used to strain paint and other liquid products. The device includes a piece of mesh material fixed at its perimeter in a ring. The material and cross-sectional shape of the ring is designed to permit compression of the shape, allowing the ring to conform to, and bias against, the lid well of a container, such as that of a paint can, by press-fit. Compression of the cross-sectional shape of the ring may be facilitated by the placement of an elastomeric spline in a channel of the ring. Additionally, a tab may be fixed to the ring of the device to provide a means for grasping the device and to disengage the device from the lid well of the container.

16 Claims, 3 Drawing Sheets

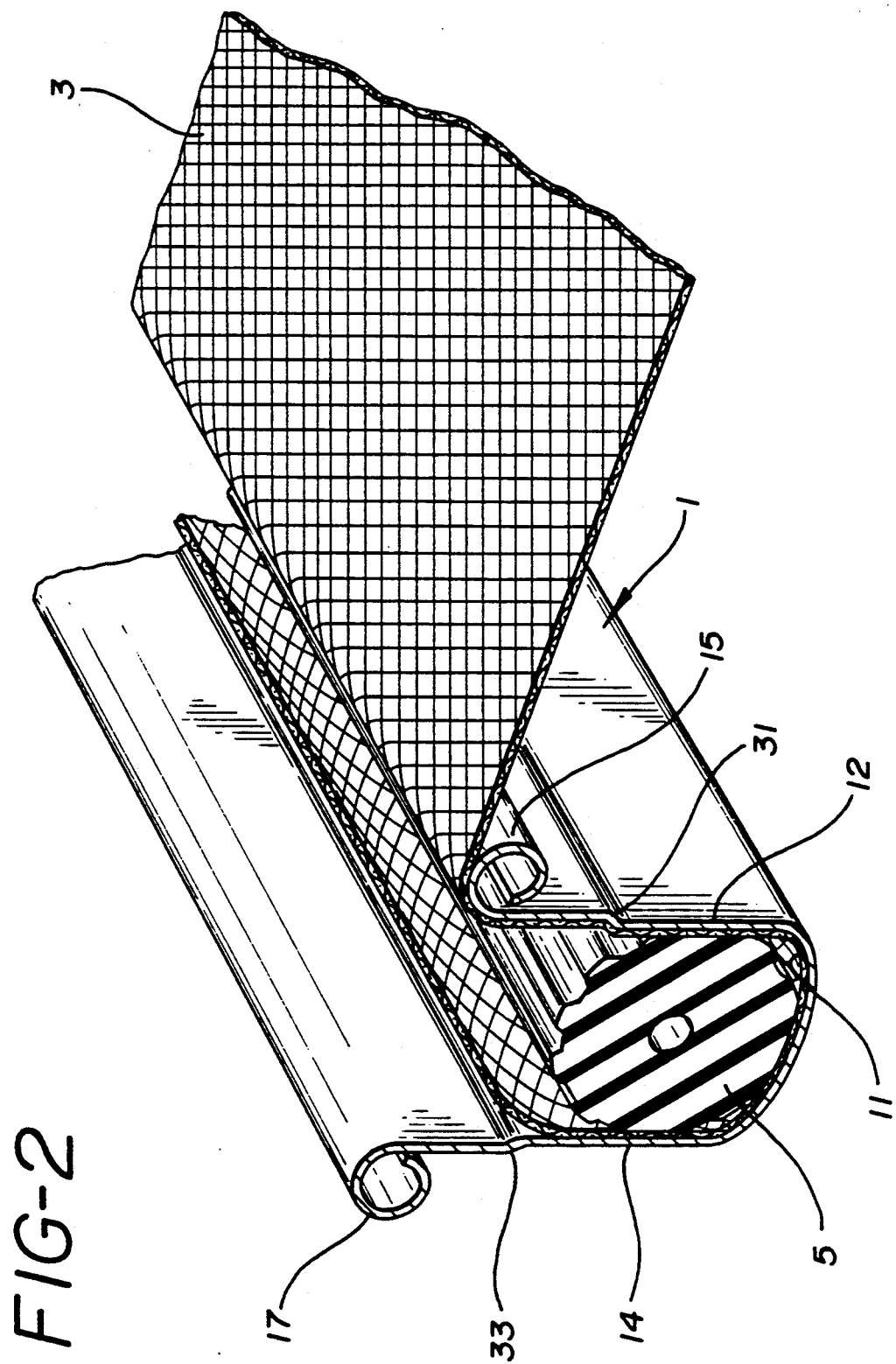

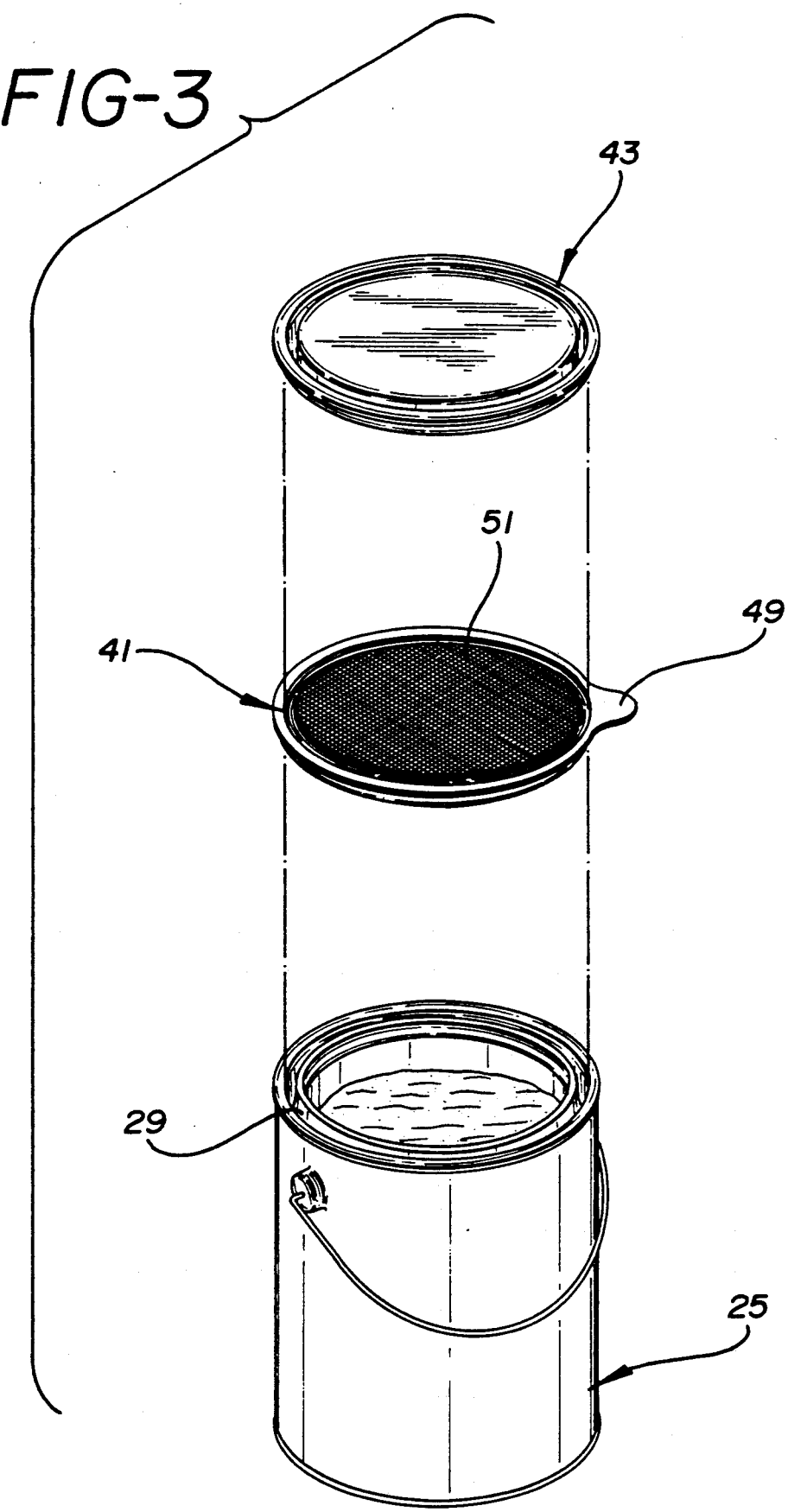

PAINT CAN STRAINER COVER

BACKGROUND OF THE INVENTION

1. Field of the Invention

The present invention is directed to strainers for paint and other liquids, which enable the user to remove solid particles from liquid by pouring the liquid through the device into another container.

2. Prior Art Statement

One experienced in the use and storage of today's typical household paints and other liquid products is certain to be aware of the fact that, when reopened after prior use, a container of liquid may contain various solid particles or impurities which could hamper the use of the liquid product. The source of the solid particles may be due to a reaction inherent in the composition of materials used to manufacture the product, or, the particles may be the result of accidental external contamination of the product. In either case, the user is forced to use some type of filtration method to purify the liquid. Generally, the prior art describes cumbersome methods or equipment used to achieve filtration of a liquid. Typical of the inventions used for this purpose is that described in U.S. Pat. No. 2,070,998, where a supporting frame attached to the periphery of a piece of mesh material is laid across the rim of a reservoir container into which the paint to be used is poured.

U.S. Pat. No. 1,087,708 involves a strainer including a circular piece of mesh material supported at its edges by an annular frame. The frame is designed to rest within a funnel-shaped body over which the liquid to be filtered is poured.

U.S. Pat. No. 4,804,470 teaches a strainer which also rests atop of a reservoir container, but which describes a more complex frame-supported mesh, enabling the user to force viscous liquids through the mesh by collapsing the frame against the mesh.

Finally, U.S. Pat. No. 3,301,404 details a strainer comprising mesh material and supporting framework which the user must hold in place over the top of the container from which he pours his liquid.

Notwithstanding the prior art, no prior art patent teaches nor renders obvious the device of the present invention. In an embodiment of the present invention, a strainer is removably engaged to the lid well of a standard paint can from which paint is poured into another reservoir, thereby achieving filtration and mixing in the same step. In the invention, the ring supporting the mesh material is press-fitted into the lid well of the paint can, thereby freeing the painter's hands for pouring. The lid for the can may be closed directly on top of the framework and mesh for storing purposes. Of course, while the invention is particularly suitable to the paint industry, the device may also be used with any container for storing liquid which relies on a lid engaged in a lid well for sealing of the container.

Because the strainer attaches to the paint can directly, the shape of the reservoirs into which paint is poured (i.e., roller trays or spray canisters) becomes unimportant to the design of the strainer, unlike in prior inventions where the strainer is built to rest on such a reservoir. Attaching the strainer directly to the paint can therefore eliminates the need for an intermediate reservoir and simplifies the process of filtering the liquid. It also enables paint manufacturers to include a strainer under a lid, and allows users to store the strainer in this manner.

For these reasons, the present invention overcomes the prior cumbersome methods for filtering paint and provides efficient advantages. Thus, attachment of the strainer directly to the container of liquid by such simple means is not taught nor rendered obvious by the prior art.

SUMMARY OF THE INVENTION

The present invention is directed toward a device used to strain paint and other liquid products. The device includes a piece of mesh material fixed at its perimeter to a ring. The material and cross-sectional shape of the ring is designed to permit compression of the shape, allowing the ring to conform to, and bias against, the lid well of a container, such as that of a paint can, by a press-fit. Compression of the cross-sectional shape of the ring may be facilitated by the placement of an elastomeric spline in a channel of the ring. Additionally, an optional tab may be fixed to the ring of the device to provide a means for grasping the device to assist in disengaging the device from the lid well of the container.

BRIEF DESCRIPTION OF THE DRAWINGS

The invention will be more fully understood by referring to the following detailed specifications, the above specification and the claims set forth herein, when taken in connection with the drawings appended hereto, wherein:

FIG. 2 shows a perspective cross-sectional view of the embodiment of FIG. 1 cut along line A—A; and FIG. 3 shows an alternative embodiment of the present view shown in an exploded perspective view in combination with a standard paint can and lid.

DETAILED DESCRIPTION OF THE INVENTION

Figure 1:
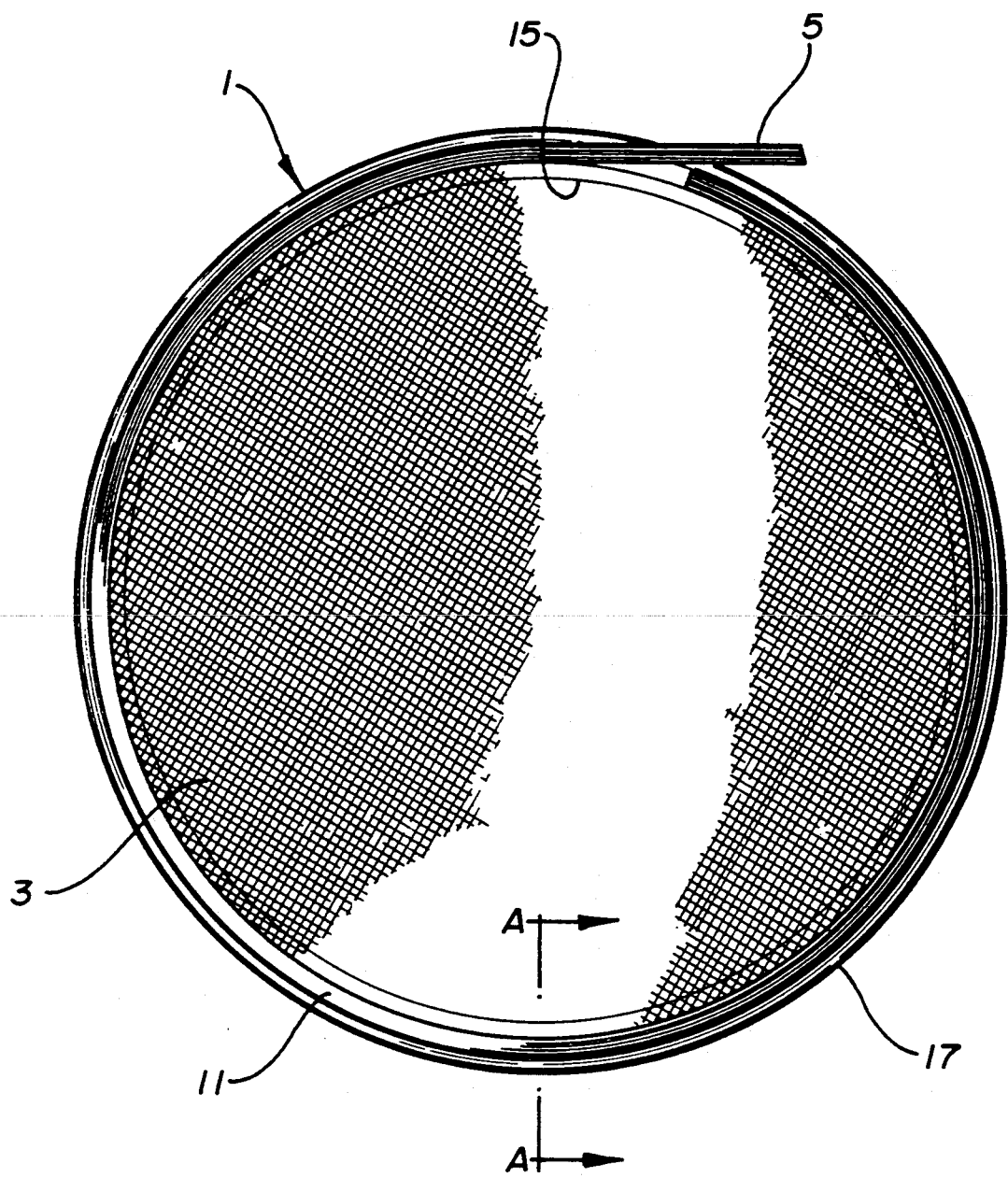
FIG. 1 shows a top view of one preferred embodiment of the present invention.

The present invention is directed toward the removal of solid particles from a liquid by means of pouring the liquid through a strainer removably attachable to a container similar to that of a standard commercial paint can. The point of the invention is to achieve such filtering simply and efficiently.

Referring now to FIG. 1, a top view of the assembled device is shown. A semi-flexible ring 1 provides the support for mesh material 3 and is shaped so that the ring 1 will both fit into the female channel of a paint can and accept the male channel of a paint can lid. The ring 1 has a cross-sectional shape that is essentially U-shaped. The trough 11 of said ring 1 accepts an elongated elastomeric spline 5. The spline 5, when positioned at the base of the trough 11 as shown in FIG. 2, pushes the walls 12, 14 of the ring 1 away from each other and permits biasing of the ring 1 against the walls of a female lid well within the rim of a paint can.

As shown in FIG. 2, the ring walls 12, 14 are further formed with flanges 33, 31 that compensate for the thickness of the invention. The flanges 33, 31 allow the invention to press-fit within a paint can rim while still allowing for the paint can lid to fit therein. Although the invention can be created without the flanges 33, 31, the relief the flanges 33, 31 provide ensure that the forces holding the ring 1 within a paint can lid will be greater than the forces holding a paint can lid onto the ring 1. This ensures that the invention will remain in place when removing the paint can lid.

A mesh material 3, shown most clearly in FIG. 1, is large enough to extend over the opening of the ring 1, and hence over the opening of a paint can. The mesh material 3 is shaped so that the edges bend over the inside periphery flange of the ring 1 and then curve in the opposite direction to conform with, and lie against, the inside walls of the trough 11 of the ring 1. The mesh 3 is interposed between the trough 11 walls of the ring 1 and the body of the spline 5 as depicted in FIG. 2. The capture of the mesh 3 is facilitated by the exterior surface of the spline 5, portions of which deform within the voids of the mesh material 3. The number of voids per square inch within the mesh material 3 is dependent upon the type of paint or liquid to be screened. Paints that have abrasives mixed therein would use a mesh material 3 with large voids to allow for the passage of abrasives, while paints used to paint car finishes, or other paints used on smooth surfaces may require a fine mesh screening that will catch even the smallest particulate matter.

Referring now to FIG. 3 a differing embodiment of the present invention is shown, including a commercial paint can 25, a strainer lid 41 and a standard paint can lid 43. In this embodiment the strainer lid 41 is made from a substantially flexible material and has a pull tab 49 attached to a point on its periphery. The tab 49 is to help remove the strainer lid 1 from the lid well 29 of a paint can 25 or the paint can lid 43 once it has been engaged therein.

The strainer lid 41 as constructed, may be snapped into the lid well 29 of the liquid supply container. Once secured to the container, the container may be tilted to effect the pouring of the liquid into any one of a number of vessels, e.g., a paint roller tray, a spray container, etc. The frame of the device is designed with enough biasing force to keep it in place in the container during pouring, without the user having to hold it in place. The device may be unistructurally formed form plastic, stamped from metal or corrugated paper or may be composed of elements of various materials fixedly combined as an assembly. If a combination of parts is used, selection of materials for different elements could vary substantially. The mesh material 51, for instance, may be either a stamping or molding of metal, plastic or ceramic. The ring framing the mesh 51 should be constructed from a material having the characteristics of both deformability and memory, allowing for a press-fit of the ring into a lid well 29 of a container. Memory of a particular material chosen for the ring may be optimized by the addition of a spline introduced into the body of the ring. The spline may take the form of an elastomer or formed metal shape with inherent memory. Conversely, the spline could take the form of a wire or cable built into the ring, to be tightened upon insertion of the strainer into the lid well 29 by some mechanical means. The type of liquid to be strained and the anticipated life of the strainer will dictate the particular choice of materials in design.

The strainer may be sold as a separate reusable or disposable accessory, or as an element incorporated into the regular packaging of a particular liquid. It may be desirable not to manufacture the present invention as part of a container because in such situations, such as the custom tinting of paint, after market ingredients are added to the manufactured products. If the present invention was in place, it would interfere with the addition and mixing of such tinting. As such, the best mode of this invention as shown in the drawings, illustrates a removable strainer lid to be added to a container upon the option of a consumer.

Obviously, numerous modifications and variations of the present invention are possible in light of the above teachings. It is therefore understood that within the scope of the appended claims, the invention may be practiced otherwise than as specifically described herein.

What is claimed is:

1. A strainer for paint and other liquid products to be used in conjunction with a standard commercial paint can having a lid well, said strainer comprising:
   a) a semi-flexible ring having a shaped cross-section, contoured and adapted to removably engage said lid well of said standard commercial paint can, said ring being formed with a trough, having an elastic spline laying therein, said ring engaging said lid well by deforming said trough and said spline within said lid well, said spline helping resist the deformation and engage said lid well;
   b) a piece of mesh material for straining liquid having approximately the same perimeter as said ring wherein said mesh material extends across the opening of said ring, and its periphery is fixedly attached to said ring; and
   c) a fastening means for fixedly attaching said mesh material to said ring.

2. The invention of claim 1 wherein said fastening means for fixedly attaching said mesh material to said ring is the interposition of the edges of said mesh material between said spline and said trough.

3. The invention of claim 1 wherein said ring and said mesh material are molded unistructurally from the same material as a single piece.

4. The invention of claim 1 wherein said trough is deeper than said lid well, wherein said deformation of the bottom of said trough into said lid well causes the top of said trough to conform to the width of said lid well, allowing the top of said trough to engage any object capable of engaging said lid well.

5. The invention of claim 2 wherein said spline has ribbing on the outer diameter in the direction of the longitudinal axis of said spline, said ribbing facilitating the capture of said mesh material between said spline and said trough of said ring.

6. The invention of claim 1 wherein said tough of said ring is of a depth to receive both said spline and downwardly extended contour of a standard commercial paint can lid.

7. A strainer for paint and other liquid products, mounted on a standard commercial paint can having a lid well, comprising in combination:
   a) A strainer having:
      (i) a semi-flexible ring with a shaped cross-section contoured and adapted to removably engage said lid well of said standard commercial paint can;
      (ii) a piece of mesh material having approximately the same perimeter as said ring, wherein said mesh material extends across the opening of said ring and its periphery is fixedly attached to said ring; and
      (iii) a fastening means for fixedly attaching said mesh material to said ring; and
   b) a paint can comprising:
      (i) a substantially planar bottom;

(ii) at least one wall wherein said wall fixedly attaches to all peripheral points of said bottom and extends upwardly to a rim, forming a container for liquid;

(iii) a lid well fixed at the end of said wall opposite from where said bottom attaches, said well running substantially around the length of said rim; and (iv) a substantially planar lid having a downwardly extended contour, said contour shaped and located to complement, and engage, said lid well.

8. The invention of claim 7 wherein a tab is fixedly attached to said strainer to facilitate grasping of said strainer for removal of said ring from the lid well of a paint can.

9. The invention of claim 7 wherein the means for engagement of said strainer to the lid well of a paint can is a press-fit wherein said semi-flexible ring deforms within said lid well.

10. The invention of claim 7 wherein said ring is formed with a trough, said trough having an elastic spline laying therein, said ring attaching to said lid well by deforming said trough and said spline within said lid well, said spline helping said trough resist the deformation and engage said lid well.

11. The invention of claim 10 wherein the edges of said mesh material are interposed and fixed between said spline and said ring.

12. The invention of claim 9 wherein said ring, said mesh material and said tab are molded unistructurally from plastic material as a single piece.

13. The invention of claim 7 wherein said trough is deeper than said lid well, wherein said deformation of the bottom of said trough into said lid well causes the top of said trough to conform to the width of said lid well, allowing said trough top to engage any object capable of engaging said lid well.

14. The invention of claim 10 wherein said spline is made from an elastomeric material.

15. The invention of claim 10 wherein said spline has ribbing on the outer diameter in the direction of the longitudinal axis of said spline, said ribbing facilitating the capture of said mesh material between said spline and said trough of said ring.

16. The invention of claim 13 wherein when said trough of said ring is press-fitted into said lid, said trough biases against the interior of said lid well, which creates and maintains a seal between said ring and said lid well.

* * * * *